United States Patent [19]

Nozawa et al.

[11] Patent Number: 5,021,804

[45] Date of Patent: Jun. 4, 1991

[54] THERMAL TRANSFER COLOR PRINTER

[75] Inventors: Masaru Nozawa; Chiharu Imaseki; Kazuyuki Inagaki, all of Osaka, Japan

[73] Assignee: Minolta Camera Kabushiki Kaisha, Osaka, Japan

[21] Appl. No.: 269,600

[22] Filed: Nov. 10, 1988

[30] Foreign Application Priority Data

Nov. 13, 1987 [JP] Japan .......................... 62-174193[U]

Sep. 30, 1988 [JP] Japan .............................. 63-248500

[51] Int. Cl.[5] ........................................... G01D 15/10

[52] U.S. Cl. ............................... 346/76 PH; 400/120; 346/136

[58] Field of Search .......................... 346/76 PH, 136; 400/120, 662

[56] References Cited

U.S. PATENT DOCUMENTS 4,768,039 8/1988 Akutagawa et al. .......... 346/76 PH

FOREIGN PATENT DOCUMENTS 3606662 9/1986 Fed. Rep. of Germany ...... 400/662

54-124743 9/1979 Japan .

0140177 8/1982 Japan .................................. 400/662

0063463 4/1986 Japan ............................. 346/76 PH 62-172054 10/1987 Japan .

*Primary Examiner*—Benjamin R. Fuller

*Assistant Examiner*—Huan Tran

*Attorney, Agent, or Firm*—Burns, Doane, Swecker & Mathis

[57] ABSTRACT

A thermal transfer color printer provided with a platen roller having elasticity and a surface displaying of low coefficient of friction relative to the recording medium and a transport mechanism which transports the recording medium by force greater than that of the platen roller, in one embodiment or pulls the recording medium from the downstream side of the transport direction while keeping the platen roller freely rotatable in another embodiment.

16 Claims, 8 Drawing Sheets

THERMAL TRANSFER COLOR PRINTER

BACKGROUND OF THE INVENTION

Thermal transfer printers which are adapted for use with plain paper, having specified surface smoothness and serving as a recording medium, for transferring a sublimable dye or ink to the paper by a thermal head with application of pressure and heat are known. Such thermal transfer color printers are used also for producing color images.

These thermal transfer color printers include those adapted to produce color images by repeatedly transferring usually yellow, magenta and cyan inks in succession for each image to be eventually produced. (these types of printers will hereinafter be referred to as the "successive color transfer type.")

With printers of the successive color transfer type, it is essential to assure color registration with improved accuracy and an increased throughput. For this purpose printing systems and paper or ink transport systems of different types have been proposed.

For example, a pin feed type transport system is known wherein pin sprockets are used for transporting fanfold paper serving as a recording medium. Cut sheets of paper or roll paper is transported by friction rollers, such as platen roller, backup roller and like transport rollers, utilizing the friction afforded by the nip of the rollers.

With the printer of the successive color transfer type, the thermal head is pressed against a platen roller in the form of a hollow cylinder under a predetermined pressure with the recording medium, i.e. printing paper, interposed therebetween, and ink is thereafter transferred from an ink film onto the printing paper by heating the thermal head. This process is repeated for each color, i.e., yellow, magenta and cyan. To superimpose the colors by transfer, the printing paper having one color transferred thereto is reversely transported to the transfer start position on the platen roller for the transfer of another color.

The cylindrical platen roller is made of an elastically deformable member so as to assure proper contact between the thermal head, the ink film and the printing paper.

However, since the platen roller is elastically deformable to produce great friction drag between the paper and the platen roller, a difference in paper transport force is likely to occur between the platen roller and the paper feeder, subsequently causing the position one color to be out of register with another color upon transfer. To avoid such a failure in color registration, the paper is transported at a low speed.

SUMMARY OF THE INVENTION

The present invention has been accomplished in view of the foregoing problems.

A first object of the invention is to provide a novel thermal transfer color printer of the successive color transfer type.

A second object of the invention is to provide a thermal transfer color printer of the successive color transfer type which is operable free of a failure in color registration.

A third object of the invention is to provide a thermal transfer color printer of the successive color transfer type adapted for an increased throughput.

The above objects of the present invention is fulfilled by a thermal transfer color printer for feeding an ink film and a recording medium in tight contact with each other between a thermal head and a platen roller, driving the thermal head to transfer ink from the ink film onto the recording medium, and thereafter separating the ink film from the recording medium. More specifically stated, the thermal transfer color printer includes:

- a thermal head for transferring ink from the ink film onto the recording medium,
- a platen roller displaying elasticity and a surface displaying a low coefficient of friction relative to paper as the recording medium,
- winding device for winding the ink film thereon,
- a tractor feeder for transporting the paper, the tractor feeder being operable to transport the fanfold paper in a direction that of transport of the ink film by a greater force than the platen roller during the period in which the thermal head transfers the ink from the ink film onto the recording medium.

According to another aspect of the present invention, the above objects are achieved by a thermal transfer, color printer of the type stated above which includes:

- a thermal head for transferring ink from the ink film onto the recording medium,
- a platen roller displaying and a surface displaying a low coefficient of friction relative to paper as the recording medium,
- a first transporting device and a second transporting device for transporting the recording medium, the first transporting device being positioned upstream from the platen roller with respect to the direction of transport of the recording medium and the second transporting device being positioned downstream from the platen roller with respect to the medium transport direction during the transfer of the ink from the ink film onto the recording medium by the thermal head, and a
- control device for controlling the operation of the platen roller, the first transporting device and the second transporting device so that the platen roller and the first transporting device are rotatable while the second transporting means is driven during the operation of transferring of the ink from the ink film onto the recording medium by the thermal head.

BRIEF DESCRIPTION OF THE DRAWINGS

The above and other objects or features of the present invention will become apparent from the following description of preferred embodiments thereof taken in conjunction with the accompanying drawings, in which.

In the following description, like parts are designated by like reference numbers throughout the several drawings.

DESCRIPTION OF THE PREFERRED EMBODIMENTS

First Embodiment

Figure 1:
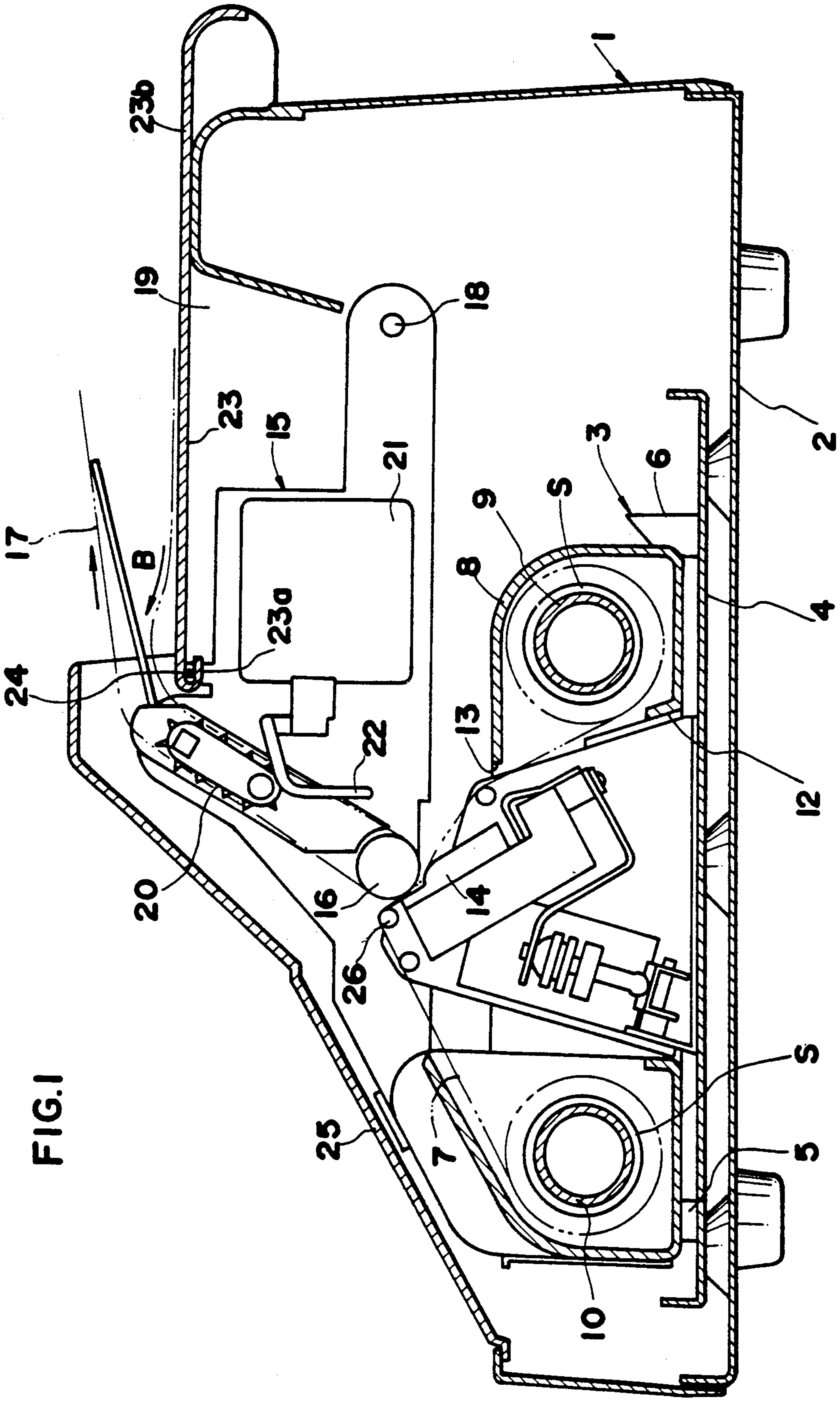
FIG. 1 is a schematic sectional view of a thermal transfer color printer embodying the invention.

With reference to FIG. 1 showing a thermal transfer color printer, a body case 1 of the printer includes a bottom plate 2 above which a cassette mount portion 3 is provided. The mount portion 3 has a base plate 4 for removably placing thereon a cassette 8 containing a thermal transfer material 7, and a pad 5 of polyurethane foam 5 and a rear positioning block 6.

The cassette 8 is made of synthetic resin and includes a rear supply roll 9 and a front takeup roll 10 each of which is supported with play S as seen in FIG. 1. The transfer material 7 is wound around the supply roll 9 and has a lead end which is affixed to the takeup roll 10 with an unillustrated adhesive tape. The portion of the material 7 between the two rolls 9 and 10 is used for thermal transfer. An unillustrated motor transmits a torque to the takeup roll 10. When the takeup roll 10 is drivingly rotated, the transfer material 7 on the supply roll 9 travels toward the takeup roll 10 without zigzagging or creasing, is used for thermal transfer in a specified position without creasing and is wound up in position around the takeup roll 10. For thermal transfer, the cassette 8 has apertures 12, 13 formed in its bottom plate and top plate, respectively. A thermal head 14 extends from the interior of the cassette 8 upward through the top plate aperture 13 when the cassette 8 is placed on the base plate 4 of the mount portion 3, as supported on the polyurethane foam pad 5 and the block 6.

The thermal head 14 pushes up the transfer material 7 within the cassette 8 beyond the cassette top plate between the two rolls 9, 10 to press the transfer material against a platen 16 of a paper feeder 15 disposed in the upper portion of interior of the body case 1 as seen in FIG. 1. At the position where the transfer material 7 is pressed against the platen, ink on the material is thermally transferred to fanfold paper 17 by the thermal head 14. A separating roller 26 is disposed in the vicinity of the thermal head 14 for separating the transfer material 7 from the fanfold paper 17 after the transfer.

The paper feeder 15 in an operative position in FIG. 1 is pivotally movable about a rear hinge 18 from this position upward through an upper opening 19 of the body case 1 to a retracted position away from the cassette mount portion 3. The paper feeder 15 has a tractor feeder 20 which is driven in synchronism with the platen 16 and which is provided above the platen 16 for feeding the fanfold paper 17 to the platen 16 in the direction of arrow B shown in FIG. 1 and delivering the paper from the platen 16. Indicated at 21 is a motor for driving the paper feeder 15, and at 22 a position sensor. The paper feeder 15 is provided with a paper guide plate 23 at an upper portion thereof. The paper guide plate 23 has a front-end bent portion 23*a* removably engaged with a rod 24 on the paper feeder 15 and a rear end 23*b* merely resting on the top plate rear portion of the case 1. The paper guide plate 23 itself is movable about the rod 24 to follow the shift of the paper feeder 15 and is removable.

The opening 19 of the body case 1 is provided with a removable front cover 25 at the portion thereof to the front of the paper feeder 15. When the front cover 25 is removed with the paper feeder 15 pivotally moved to its retracted position, the cassette mount portion 3 is entirely exposed to render the cassette 8 readily removable through the opening 19.

Figure 2:
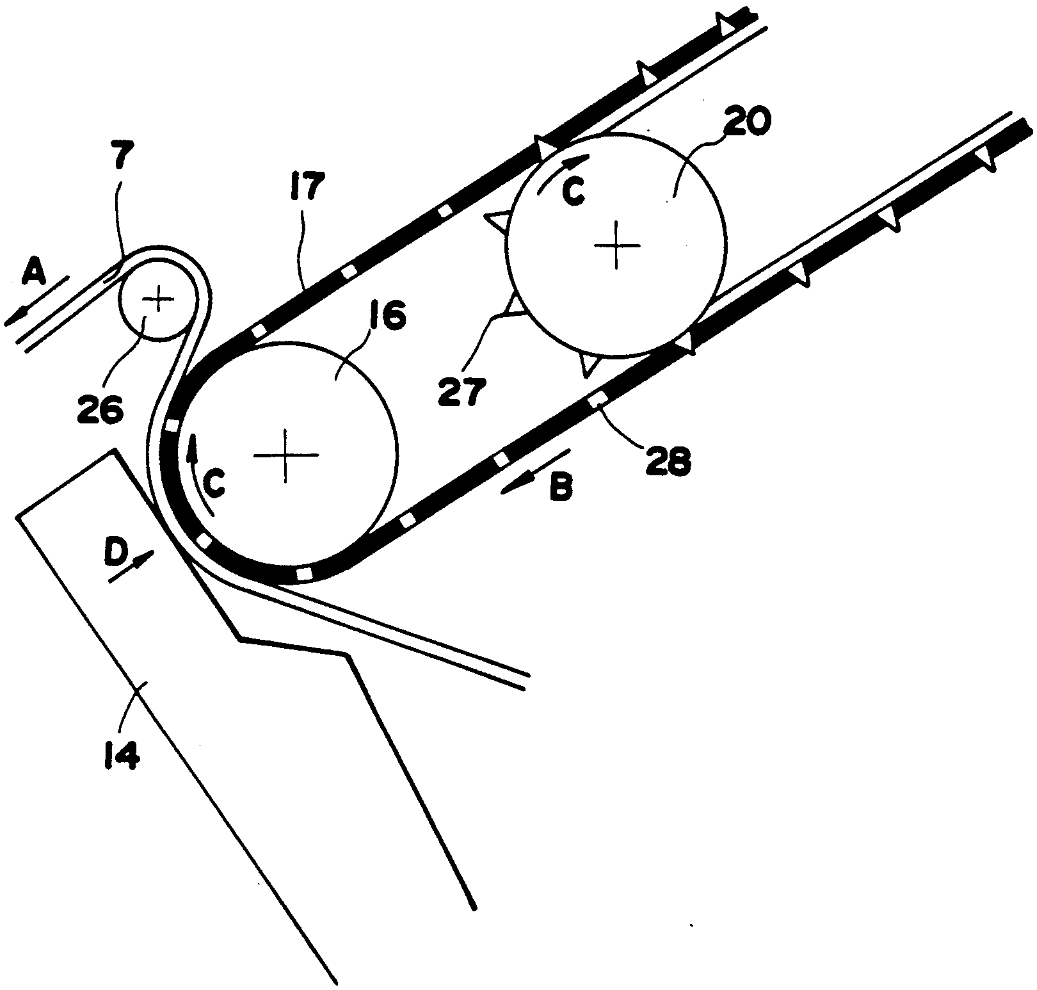
FIG. 2 is an enlarged view showing in greater detail the transfer means included in the printer.

The main components of the thermal transfer color printer will be further described with reference to FIG. 2 which is a fragmentary view schematically showing the printer. To position the fanfold paper 17 for transfer, the tractor feeder 20 has pins 27 engaging in perforations 28 formed in the paper 17 along its opposite sides, with the paper 17 passed around the platen roller 16. Accordingly, the tractor feeder 20 and the platen roller 16, when driven in synchronism, transport the fanfold paper 17 forward or reversely. The transfer material, i.e. ink film 7, extending from the supply roller 9 to the takeup roller 10 is brought into intimate contact with the fanfold paper 17 at a portion of the outer periphery of the platen roller 16, and the thermal head 14 is pressed against the platen roller at the transfer position under a predetermined pressure to transfer meltable ink from the ink film 7 onto the fanfold paper 17 by heating. The ink film 7 comprises a film sheet having approximately the same width as the fanfold paper 17 and coated with ink layers of three colors, i.e. yellow, magenta and cyan, having a specified length and arranged in this order. When a print command is given by depressing a key or switch, the fanfold paper 17 is transported forward in a direction B shown, and the position sensor 22 functions to set the paper at the transfer start position. The ink film 7 is also transported forward in a direction A shown to stop the leading end of the yellow ink layer at the start position. Subsequently, the thermal head 14, which has approximately the same width as the fanfold paper, is moved in a direction D shown and thereby pressed against the platen roller 16. The ink film 7 is further transported in the direction of arrow A and the fanfold paper 17 in the direction of arrow B for the thermal head 14, which is heated according to image data, to transfer the yellow ink from the ink film 7 onto the fanfold paper 17.

When the image data for one color is completely transferred in this way, the thermal head 14 is moved in a direction opposite to the direction of arrow D out of pressing contact with the ink film to provide a clearance of about 1 mm between the platen roller 16 and the head 14. At this time, the ink film 7 is held in intimate contact with the fanfold paper 17 relatively tightly by the pressure and heat given by the thermal head 14, so that the film and the paper are cooled while being sent forward in intimate contact with each other. After the ink has been stably fixed to the paper 17, the film is separated from the paper by the separating roller 26. A suitable torque is applied to the takeup roller 10 since the ink film 7, if slackened, will not be positioned properly but becomes creased, creates a fault in the image or is not windable properly. The tractor feeder 20 and the platen roller 16 are thereafter driven in a direction opposite to the direction of arrow C the same number of steps as the forward rotation to return the paper 17 to the transfer start position for the transfer of the next color.

Faulty images produced by the thermal head 14 on the paper over the platen roller 16 are attributable to improper contact between the thermal head 14 and the platen roller 16. To obviate this drawback, the platen roller 16 is conventionally made of a rubber of low hardness to permit the thermal head to be pressed against the platen roller over an increase area. However, even if the platen roller 16 is rotated in synchronism with the tractor feeder 20, great friction drag occurs between the fanfold paper and the surface of the platen roller 16 which is made of rubber, with the result that the platen roller 16 exerts a greater force of transport than the tractor feeder 20 on the fanfold paper.

Furthermore, when the preparation of the platen roller 16 involves an outside diameter tolerance, a difference occurs between the platen roller 16 and the tractor feeder 20 in the transport speed given to the fanfold paper. Consequently, pins 27 of the tractor feeder 20 are likely to collapse the perforated portion of the fanfold paper, or the fanfold paper will be slackened between the tractor feeder 20 and the platen roller 16. The transferred images of different colors which are produced by repeated forward and reverse transport of the fanfold paper will then be positioned out of register with one another.

Figure 3:
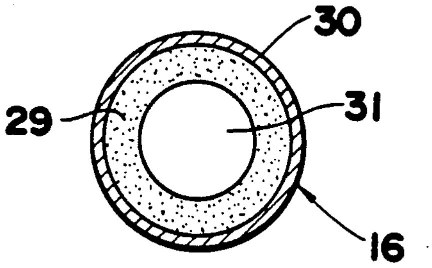
FIG. 3 is a view in cross section showing a platen roller included in the printer.

The platen roller 16, which is shown in FIG. 3, comprises a metal core 31 for transmitting a transport force, a rubber layer 29 formed around the core for the roller to be pressed on over a wider area by the thermal head, and a fluororesin coating 30 covering the surface of the rubber layer 29 to reduce the friction drag between the roller and the fanfold paper 17 and to thereby eliminate the drawbacks of the prior art. The rubber layer 29 is made of silicone rubber having a hardness of 30 degrees according to JIS, K6301, 5.2 Spring Hardness Test, Type A. The fluororesin coating 30 is formed by applying a fluororubber aqueous coating composition (DAIEL RATEX GLS1213, product of DAIKIN INDUSTRIES LTD.) to the rubber layer 29 to a thickness of about 30 micrometers, and baking the composition. It is generally desirable that the fluororesin coating 30 be 15 to 45 micrometers in thickness to assure a satisfactory pressing contact portion and high durability. The platen roller 16 has a surface hardness of 35 ±5 degrees according to JIS, K6301, 5.2 Spring Hardness Test, Type A so as to provide a satisfactory transfer portion by the pressing contact of the thermal head, as afforded by the conventional platen roller which is made of rubber only. However, since the surface roughness of the rubber layer 29 influences the surface roughness of the coating 30, the rubber layer 29 needs to be polished accurately.

While the platen roller 16 is prepared by coating an elastic material such as silicone rubber with fluororesin and heating the coating as described above, the roller can alternatively be prepared using an extruded film or tube of a fluororesin, e.g. PFA (perfluoroalkoxy resin) or PTFE (polytetrafluoroethylene), having a thickness of about 30 micrometers, by covering a silicone rubber roller and contracting the covering with heating to form a fluororesin coating.

Further instead of using the coating or covering of fluororesin or like substance of low surface energy, the outermost layer of silicone rubber, fluororubber or like elastic material may be surface-treated with an acid or alkali to harden the layer and make the layer less frictional.

Furthermore, the platen roller can be made of a mixture of fluororubber or fluororesin and silicone rubber in a specified ratio and thereby given an outer surface of reduced friction.

Although the platen roller 16 of the present embodiment is adapted to transmit a transport force to the paper, the drive force for transporting the paper may be given by the tractor feeder 20 only without using the platen roller 16 as transmitting means.

When thus made totally free of the drive force, the platen roller 16 may be in the form of a plate, semicylinder or the like.

Next, JIS, K6301, 5.2 Spring Hardness Test, Type A mentioned above will be described.

JIS K6301 5.2 Spring Hardness Test, Type A 5.2.1 Test Piece With type A, the test piece should be as a rule at least 12 mm in thickness. Test pieces less than 12 mm should be placed in layers so as to be at least 12 mm in combined thickness.

The measuring face of the test piece, if not smooth, should be smoothed by polishing.

Note:

"The measuring face should be so sized that the the pressure surface of the tester can be positioned within the extent of the face.

5.2.2 Tester

Figure 7A:
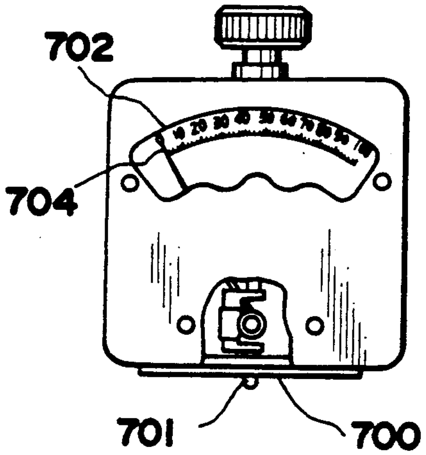
FIGS. 7 (*a*) and 7 (*b*) are schematic illustrations of a spring hardness tester for measuring the hardness of the platen roller of the invention.
Figure 7B:
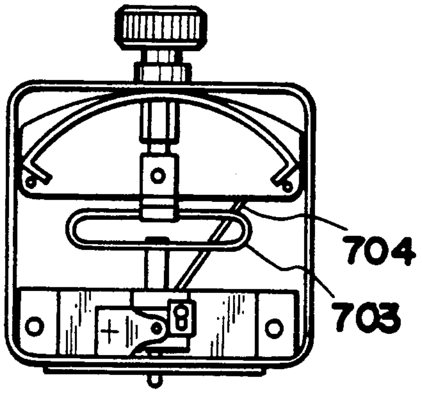

FIGS. 7 (*a*) and (*b*) show an example of tester, i.e. a spring hardness tester, type A.

The tester has a pressure needle 701 projected from a center bore of the pressure surface 700 by a spring 703. The hardness is indicated on a scale 702 in terms of the distance k the pressure needle 701 is retracted by the face of the test piece when the pressure surface 700 is brought into contact with the test piece face.

Figure 8A:
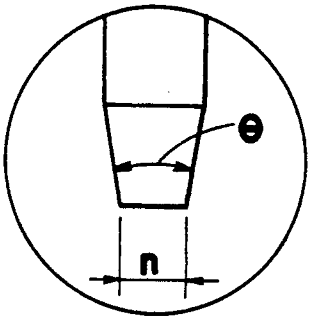
FIGS. 8 (*a*) and 8 (*b*) are enlarged view showing a pressure needle of the tester.
Figure 8B:
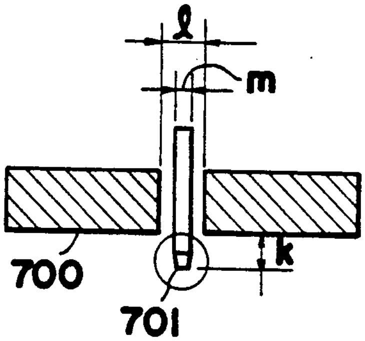
Figure 9:
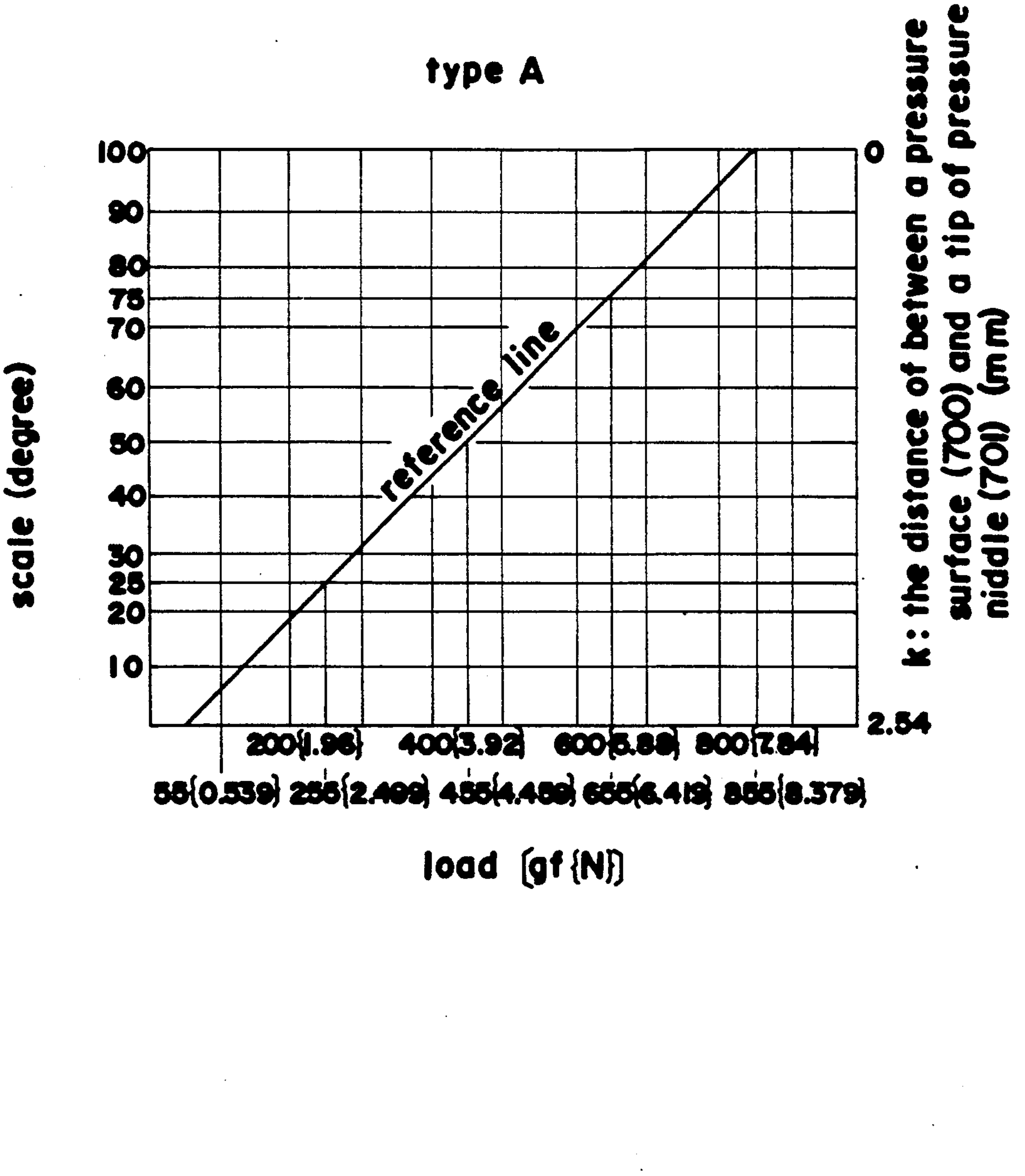
FIG. 9 is a graph showing the relationship of the load with the scale and k.

Note:

* The pressure surface 700 is perpendicular to the pressure needle 701 and is centrally formed with the bore for passing the needle 701 there through as shown in FIG. 8 (b). The surface should be at least 10 mm in diameter.
* The allowance for a reference line (FIG. 9) showing the relationship between the force of the spring and the movement of the needle 701 relative to the scale 702 is ±8 g. The pressure needle 701 and a pointer 704 should be movable without any play relative to each other.
* The pressure needle 701 is made of a material resistant to abrasion and corrosion and is so shaped as shown in FIGS. 8 (*a*) and (*b*). With reference to these drawings, l is about 3.2 mm, m is 1.3±0.1 mm, n is 0.79±0.02 mm, and $\theta$ is 35 ° ±0.25° .

The pressure needle should be positioned concentrically with the bore. When the pointer is at 0 on the scale, the need tip should be projecting from the pressure surface by $2.54^{0}_{-0.05}$ mm. At 100 on the scale, the needle tip should be on the same plane as the pressure surface.

* The scale 702 has 0 to 100 graduations which are equidistantly spaced.

5.2.3 Testing Method

The tester is held vertically, and the pressure surface 700 is brought into contact with the measuring face of the test piece with the pressure needle 701 positioned perpendicular thereto, whereupon the hardness of the test piece is read from the scale 702. When the scale is to be read a given period of time after the contact of the pressure surface, it is desirable to use a suitable auxiliary device which is adapted to hold the tester vertically to position the pressure needle perpendicular to the measuring face before testing.

In this case, the tester is vertically pressed on under a load of 1000 gf{9.81N}, and the scale is read.

With the first embodiment described above, the surface of the platen roller is reduced in friction, whereas the engagement of the pins of the tractor feeder in the perforations of the fanfold paper diminishes the likelihood of the possible failure in color registration.

Nevertheless, when cut sheets of paper or roll paper is used as the recording medium, the surface of the platen roller, when made less frictional, is likely to permit slippage of the paper relative to the platen roller during transport, failing to assure proper color registration.

This problem is overcome by the second embodiment to be described below.

Second Embodiment

Figure 4:
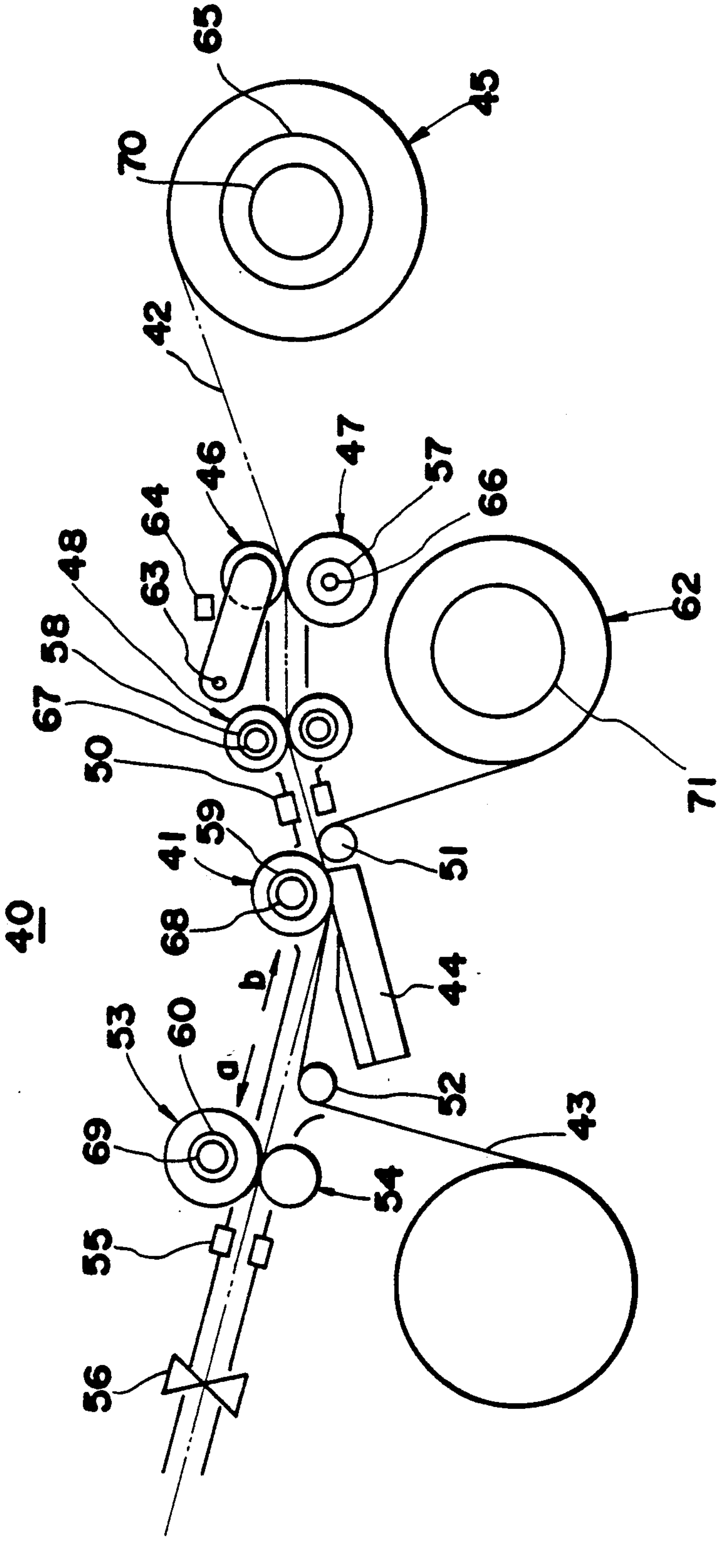
FIG. 4 is a schematic illustration of transfer means and a paper transport system included in another embodiment of the invention.

FIG. 4 is a schematic illustration showing a thermal transfer color printer embodying the invention for use with paper of A4 size, for example, more specifically the transfer means and recording paper transport system thereof.

The printer body 40 has approximately centrally thereof a platen roller 41 the same as the one used in the first embodiment. A thermal head 44 is positioned for pressing recording paper 42 and an ink film 43 against the platen roller 41. The paper 42, which is in the form of a roll, is supported by a paper supply-winding reel 45. Arranged along the path of transport of the recording paper toward the direction of transport thereof are a pay-off roller 47, feed roller 46 adapted for pressing contact with the pay-off roller 47, first transport roller 48, driven roller pressed against the roller 48, first sensor 50, film separating roller 51, platen roller 41, thermal head 44 to be pressed against the platen roller 41 for transfer, second transport roller 53, driven roller 54 pressed against the roller 53, second sensor 55 and cutter 56.

The feed roller 46 is movable about a pivot 63. A sensor 64 detects whether the feed roller 46 is in a raised position (UP) away from the pay-off roller 47 or in pressing contact therewith (DOWN).

The ink film 43 comprises a film sheet having approximately the same width as the recording paper 42, and ink layers of three colors, i.e. yellow, magenta and cyan, coating the sheet, having a specified length and arranged in this order. The ink film 43 is wound around a film supply reel 51 and is paid off therefrom and wound on a takeup reel 62 by a motor 71.

Figure 5:
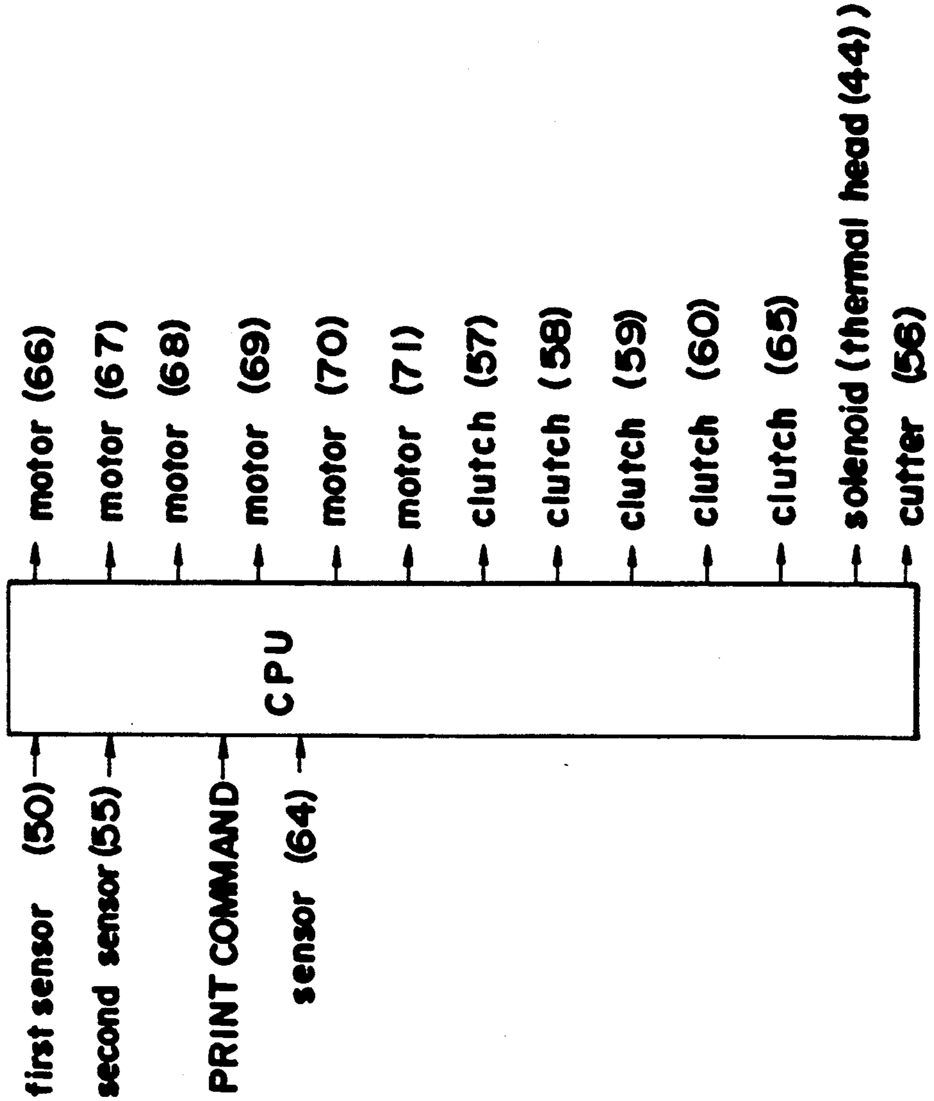
FIG. 5 is a block diagram showing the control system of the embodiment of FIG. 4.

FIG. 5 is a block diagram showing the control system for the present embodiment. A CPU receives a signal from the sensor 64, PRINT COMMAND for starting a transfer operation, and signals from the first sensor 50 and the second sensor 55 for detecting the position of the paper 42. In response to these inputs, the CPU controls motors 66, 67, 68, 69, 70 and 71 for driving the pay-off roller 47, first transport roller 53, platen rroller 41, second transport roller 53, paper supply-winding winding reel 45 and film take-up reel 60 respectively, and also controls clutches 57, 58, 59, 61 and 65 for effecting or interrupting the transmission of torque from the motors. The CPU further controls a solenoid for moving the thermal head 44 upward or downward and the cutter 56 for cutting the recording paper after transfer.

Figure 6:
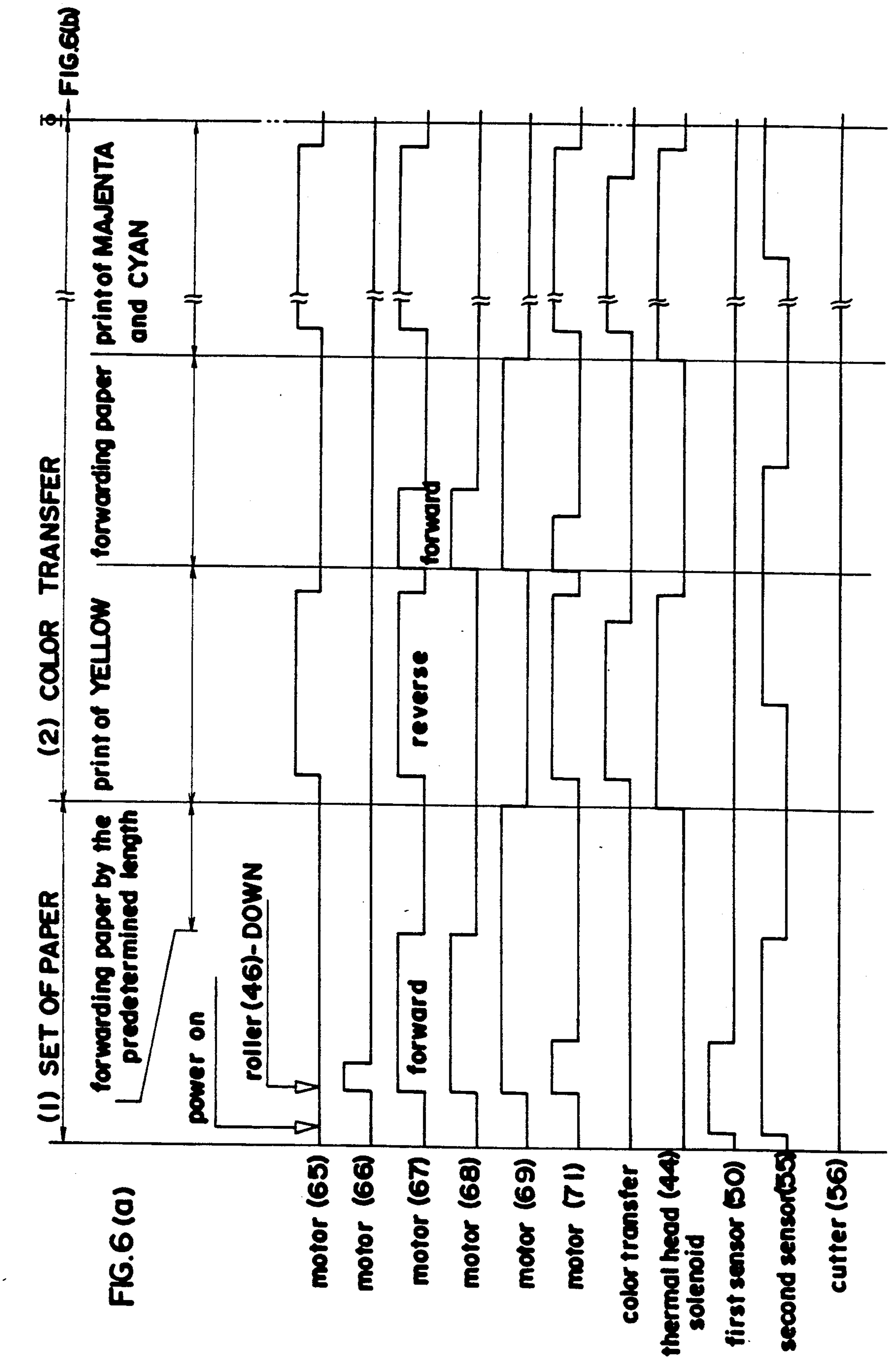
FIGS. 6 (*a*) and 6 (*b*) in combination show a schematic time chart for illustrating the operation of the embodiment of FIG. 4.
Figures 6A, 6B:
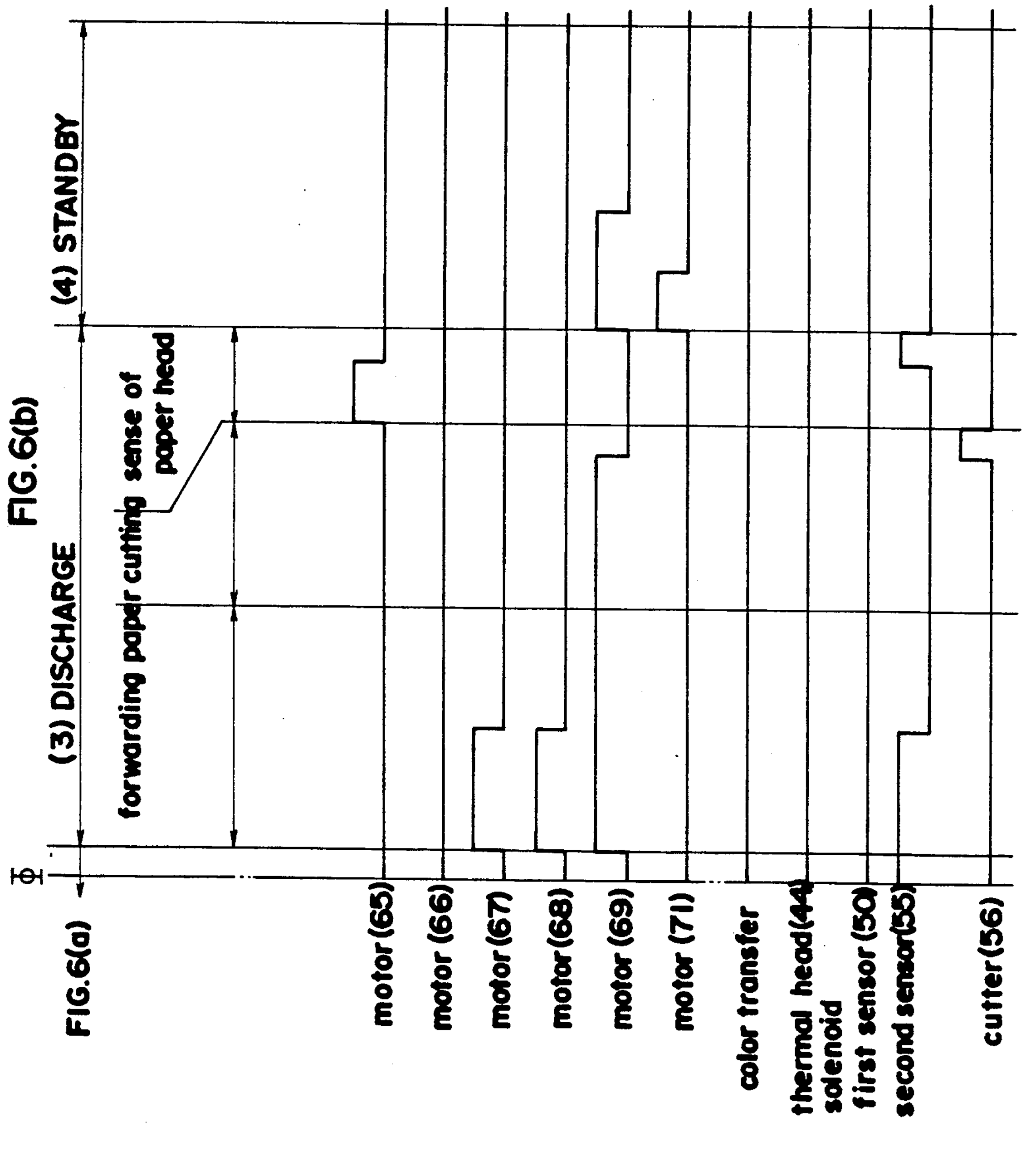

FIG. 6 is a time chart showing the operation of the present embodiment. The operation of the embodiment will be described below with reference to time.

(1) Setting of Paper

After a roll of recording paper 42 is placed on the supply-winding reel 45, the feed roller 46 is raised about the pivot 63, the leading end of the paper 42 is placed between the feed roller 46 and the pay-off roller 47, and the feed roller 46 is lowered, whereupon the sensor 64 detects the roller 46 in the DOWN position to feed a signal to the CPU. This initiates feed of the paper 42 and forwarding of the ink film 43 in sequence.

More specifically, the motors 66, 67, 68 and 69 for driving the pay-off roller 47, first transport roller 48, platen roller 41 and second transport roller 53 are energized to transport the paper 42 in the direction of arrow a shown in FIG. 4. At this time, the reel 45 is made free to rotate by the clutch 65. The thermal head 44 is held retracted away from the ink film 43 by the unillustrated solenoid. On the other hand, the ink film 43 is forwarded by the motor 71 for the transfer of the yellow ink first.

Upon lapse of a predetermined period of time, the motor 66 driving the pay-off roller 47 is deenergized to render the roller 49 free to rotate by the clutch 57.

Subsequently, the leading end of the paper 42 traveling in the direction of arrow a passes the first sensor 50 and reaches the second sensor 55, whereupon the motors 67 and 68 are turned off, permitting the clutches 58, 59 to make the first transport roller 48 and the platen roller 41 free to rotate. Consequently, after the leading end of the paper 42 reaches the second sensor 55, the paper is transported in the direction of arrow a only by the second transport roller 53.

Since the present embodiment is adapted for use with paper of A4 size, the motor 69 for the second transport roller 53 is so controlled as to stop the leading end of the paper 42 at a position 420 mm away from the transfer position on the platen roller 41.

Thus, the second transport roller 53 only is driven to draw the paper 42 for accurate feeding because if the rollers 47, 48, 41 and 53 are all driven, it is difficult to operate these rollers in synchronism and to feed the paper 42 accurately.

(2) Color Transfer

After the specified length of paper 42 has been transported by the second transport roller 53 only, a key or switch is depressed to feed PRINT COMMAND to the CPU, whereupon transfer of the yellow ink is started first.

The thermal head 44 is pressed against the platen roller 41, which is made free to rotate by the clutch 59, by the solenoid (not shown), with the paper 42 and the ink film 43 interposed between the roller and the head.

Next, the clutch 60 makes the second transport roller 53 free to rotate, and the motor 67 and the clutch 58 drive the first transport roller 48 to transport the paper 42 in the direction of arrow b. At this time, the reel 45 is driven by the motor 70 in the winding direction with a low torque so as not to slacken the paper 42. The ink film 43 is guided by the guide roller 52 and paid off from the supply reel 61 and wound up on the takeup reel 62 by the motor 71.

The first transport roller 48 only is allowed to transport the recording paper 42 toward the direction of arrow b to prevent the paper 42 from creasing or slackening and thereby preclude faults in the image and improper winding operation.

At the transfer position, on the other hand, the thermal head 44 is heated to transfer the ink from the film onto the paper 42 on melting.

After the transfer, the ink film 43 is held in intimate contact with the paper 42 relatively tightly by the pressure and heat applied, so that the film and the paper are cooled while being transported toward the direction of arrow b. After the ink has been stably fixed to the paper 42, the ink film is separated off by the separating roller 51.

After the separation of the ink film 43 from the paper 42, the paper 42 is transported in the direction of arrow a for the transfer of the next color, i.e. magenta, to position the magenta ink layer on the ink film 43 at the transfer position.

As in the case of transfer of the yellow ink, the first transport roller 48, the platen roller 41 and the second transport roller 53 are driven first. After the leading end of the paper is detected by the second sensor 55, the second transport roller 53 only operates to transport the paper 42 by the specified length, whereupon the roller 53 is stopped.

Subsequently, the second color, magenta, and the third color, cyan, are transferred by the same process as yellow.

(3) Discharge

When the ink film 43 has been separated from the recording paper 42 after the completion of transfer of the third color cyan, the paper 42 is wound on the reel 45 as transported in the direction of arrow b. Accordingly, the image bearing portion of the paper 42 is discharged by being transported in the direction of arrow a and cut off by the cutter 56.

More specifically, the motors 67, 68 and 69 are driven to cause the first transport roller 48, the platen roller 41 and the second transport roller 53 to discharge the paper portion 42 from the printer. The leading end of the paper 42 is thereafter detected by the second sensor 55, whereupon the rollers other than the second transport roller 53 and the reel are made free to rotate by the clutches concerned. The second transport roller 53 continues to rotate to position the leading end of the paper 42 at a position 420 mm away from the cutter 56, whereupon the second transport roller 53 is also stopped, and the paper 42 is cut by the cutter 56.

(4) Transport of Paper to Standby Position

After the paper 42 has been cut by the cutter 56, the paper is rewound in the direction of arrow b by the first transport roller 48 only in preparation for the next transfer operation. Upon the second sensor 55 detecting the leading end of the paper, the second transport roller 53 only is driven to transport the paper in the direction of arrow a and bring the leading end to the position at a distance of 420 mm from the transfer position on the platen roller 41, whereupon the paper is halted in a standby state.

Although the second embodiment includes the same platen roller as used in the first embodiment, the platen roller may be any one of those prepared by the different methods described with reference to the first embodiment.

Although the present invention has been fully described by way of examples with reference to the accompanying drawings, it is to be noted that various changes and modifications will be apparent to those skilled in the art. Therefore, unless otherwise such changes and modifications depart from the scope of the invention, they should be construed as being included therein.

What is claimed is:

1. A thermal transfer color printer for feeding an ink film and a recording medium in tight contact with each other between a thermal head and a platen roller, driving the thermal head to transfer ink from the ink film onto the recording medium, and thereafter separating the ink film from the recording medium, comprising:

a thermal head for transferring ink from the ink film onto the recording medium, a platen roller having elasticity and a surface layer displaying a low coefficient of friction relative to the recording medium, first transporting means and second transporting means for transporting the recording medium, the first transporting means being positioned upstream from the platen roller with respect to the direction of transport of the recording medium and the second transporting means being positioned downstream from the platen roller with respect to the medium transport direction during the transfer of the ink from the ink film onto the recording medium by the thermal head, and control means for controlling the operation of the platen roller, the first transporting means and the second transporting means so that the platen roller and the first transporting means are rotatable while the second transporting means is driven during the transfer of the ink from the ink film onto the recording medium by the thermal head.

2. A thermal transfer color printer as claimed in claim 1, wherein said platen roller has an inner layer being made of elastic material and a surface layer being made of fluororesin.

3. A thermal transfer color printer as claimed in claim 2, wherein said surface layer of said platen roller has a thickness in the range of 15 to 45 μm.

4. A thermal transfer color printer as claimed in claim 2, wherein said surface layer is produced by applying an aqueous solution of fluororubber then baking the composition.

5. A thermal transfer color printer as claimed in claim 2, wherein said surface layer is produced by covering said inner layer with a thin film made of fluororesin then shrinking the thin film by heat to thereby tightly surround to said inner layer.

6. A thermal transfer color printer as claimed in claim 1, wherein said platen roller is produced by treating the surface of said platen roller with acid or alkaline to reduce the coefficient of friction.

7. A thermal transfer color printer as claimed in claim 1, wherein said platen roller is comprised of the mixture of silicon rubber and fluororubber.

8. A thermal transfer color printer as claimed in any one of claims 1, 2, or 3 wherein said platen roller has a surface hardness of 35±5 degrees according to JIS, K6301, 5.2 Spring Hardness Test, Type A.

9. A thermal transfer color printer as claimed in claim 1, wherein the ink film has a plurality of color portions and the printer is adapted to produce a color image, said color image being produced by superimposing colors of said color portions by repeatedly transferring one of said color portions in succession onto the same portion of the recording medium.

10. A thermal transfer color printer as claimed in claim 9, wherein the plurality of color portions includes yellow, magenta and cyan portions.

11. A thermal transfer color printer as claimed in claim 1, wherein the ink film and the recording medium are transported in tight contact with each other during a predetermined time following termination of the transfer of the ink from the ink film onto the recording medium by the thermal head, and then the ink film and the recording medium are separated.

12. A thermal transfer color printer to transfer ink from an ink film onto a recording medium while in contact with each other, comprising:

a thermal head for transferring ink from the ink film onto the recording medium.

a platen roller having elasticity and a surface displaying a low coefficient of friction relative to the recording medium, supplying means for supplying the recording medium, first transporting means, positioned between the platen roller and the supplying means, for transporting the supplied recording medium in forward and reverse directions, second transporting means, positioned at an opposite side of the platen roller with respect to the first transporting means, for transporting the supplied recording medium in the forward and reverse directions, control means for controlling the operation of the platen roller, the first transporting means, and the second transporting means so that the second transporting means is driven so as to transport the recording medium in the forward direction toward the second transporting means from the platen roller, and then the first transporting means is driven so as to transport the recording medium in the reverse direction opposite the forward direction while the platen roller and second transporting means are maintained freely rotatable and the thermal head is driven so as to transfer ink from the ink film onto the recording medium.

13. A thermal transfer color printer as claimed in claim 12, wherein the recording medium is formed in a roll.

14. A thermal transfer color printer in which a recording medium is transported in one direction and the other direction opposite to the one direction for feeding the recording medium and an ink film in contact with each other between a thermal head and a platen roller and driving the thhermal head to transfer ink from the ink film onto the recording medium during the transport of the recording medium in the one direction, comprising:

first transporting means, positioned downstream from the platen roller with respect to the one direction, for transporting the recording medium in the one direction;

second transporting means, positioned upstream from the platen roller with respect to the one direction, for transporting the recording medium in the other direction; and means for controlling the platen roller to be freely rotatable during the transport of the recording medium in the other direction.

15. A thermal transfer color printer for transferring ink from an ink film onto a recording medium while in contact with each other, comprising:

a thermal head for transferring ink from the ink film onto the recording medium;

a platen roller;

supplying means for supplying the recording medium;

first transporting means, positioned between the platen roller and the supplying means, for transporting the supplied recording medium in forward and reverse directions;

second transporting means, positioned at an opposite side of the platen roller with respect to the first transporting means, for transporting the supplied recording medium in the forward and reverse directions; and means for controlling the platen roller and the second transporting means so that the second transporting means is driven so as to transport the recording medium in the forward direction while the platen roller is maintained freely rotatable.

16. A thermal transfer color printer as claimed in claim 15, wherein the thermal head is driven so as to transfer ink from the ink film onto the recording medium when the recording medium is transported by the first transporting means in the reverse direction and thereafter the second transporting means transports the recording medium in the forward direction.

* * * * *